(No Model.) 2 Sheets—Sheet 1.
J. VON GRUBINSKI.
APPARATUS FOR PURIFYING AND HEATING FEED WATER.
No. 580,274. Patented Apr. 6, 1897.
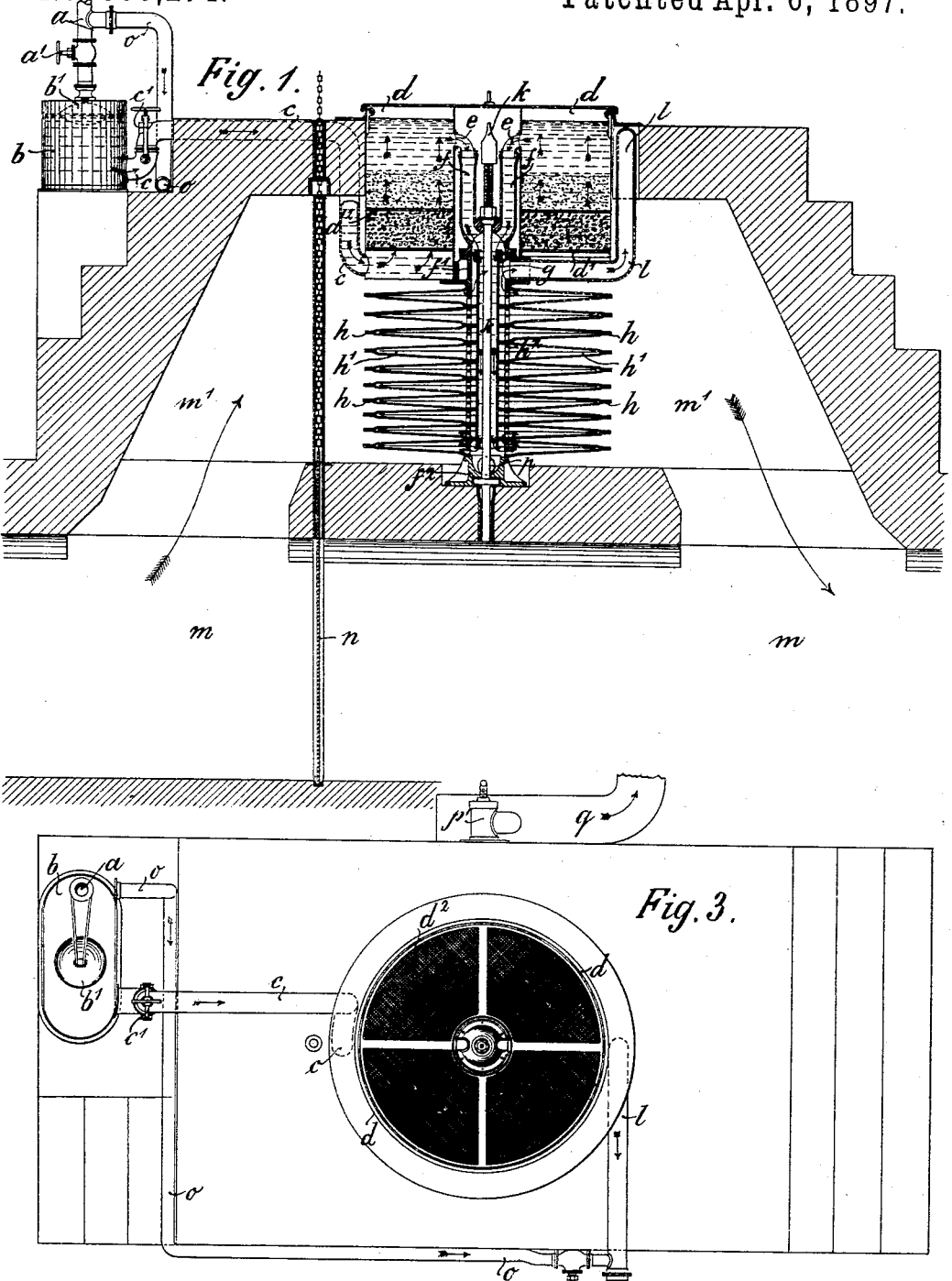

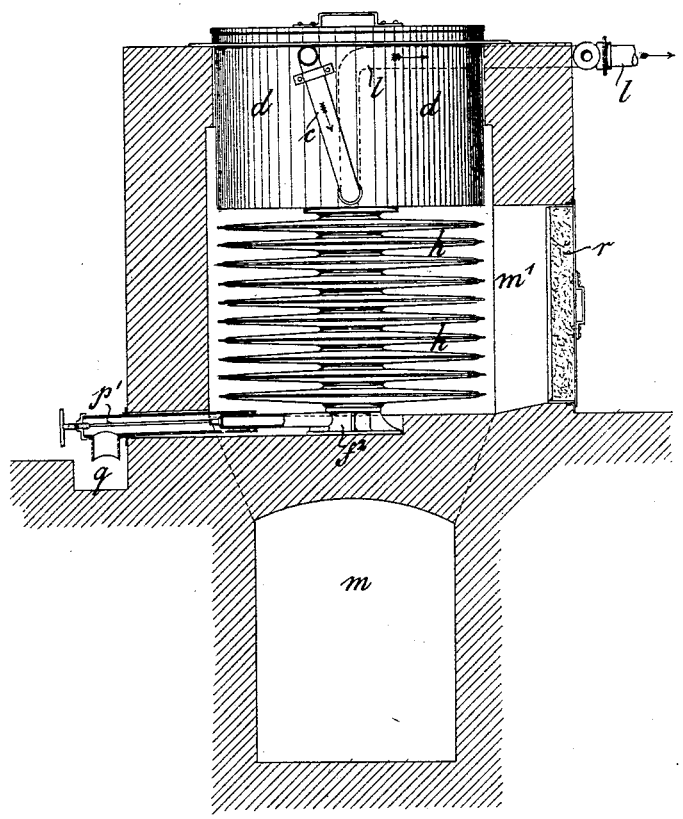
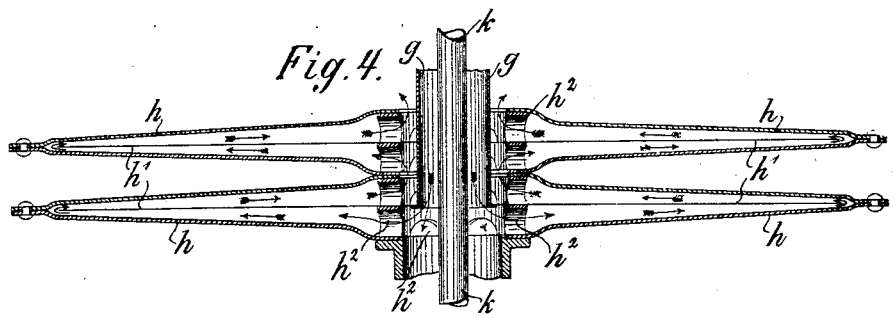

UNITED STATES PATENT OFFICE.

JAN VON GRUBINSKI, OF WARSAW, RUSSIA.

APPARATUS FOR PURIFYING AND HEATING FEED-WATER.

SPECIFICATION forming part of Letters Patent No. 580,274, dated April 6, 1897.

Application filed November 6, 1896. Serial No. 611,214. (No model.) Patented in England September 10, 1896, No. 20,087.

*To all whom it may concern:*

Be it known that I, JAN VON GRUBINSKI, a subject of the Czar of Russia, residing at Warsaw, in the Empire of Russia, have invented certain new and useful Improvements in Apparatus for Purifying and Heating Feed-Water for Steam-Generators, (for which I have obtained Letters Patent of Great Britain No. 20,087, dated September 10, 1896,) of which the following is a specification.

My invention has relation to an apparatus for the purification and heating of feed-water for steam-generators, and in such connection it relates particularly to the construction and arrangement of such an apparatus.

The principal objects of my invention are, first, to provide an apparatus for the purification and heating of feed-water prior to its introduction into the steam generator or boiler, whereby the formation of incrustations in the generator or boiler is prevented and a considerable saving of fuel effected in the heating of the feed-water; second, to provide in an apparatus of the character described, in connection with a precipitating or purifying vessel and a filtering-chamber, a series of hollow chambers arranged in substantially horizontal planes, said chambers being superposed and each having connections with the others arranged so that the water is forced to travel downward and then upward through the chambers before its delivery to the generator or boiler, and, third, to provide in an apparatus of the character described, in connection with the hollow chambers wherein the water is adapted to be heated, pipe connections and valves whereby when required water may be conducted in a reverse direction through the chambers for the purpose of cleansing the same.

My invention, stated in general terms, consists of an apparatus for the purification and heating of feed-water constructed and arranged in substantially the manner hereinafter described and claimed.

The nature and objects of my invention will be more fully understood from the following description, taken in connection with the accompanying drawings, forming part hereof, in which—

Figure 1 is a longitudinal view, partly in section and partly in elevation, of an apparatus embodying main features of my invention. Fig. 2 is a cross-sectional view illustrating the filtering vessel and the disk-like heating-chambers in elevation. Fig. 3 is a top or plan view of Fig. 1, and Fig. 4 is an enlarged detail sectional view of two of the heating-chambers detached from the other portion of the apparatus.

Referring to the drawings, $a$ represents a pipe leading from an elevated water-reservoir (not shown) to a vessel $b$, in which is placed a chemical adapted to precipitate the calcareous and similar incrustating impurities of the water. In the vessel $b$ is arranged a float $b'$, adapted when the liquid reaches a certain height in said vessel to close the outlet from the pipe $a$ into said vessel.

From the vessel $b$ extends a pipe $c$, leading to the bottom of a filtering vessel $d$, in which are located two strainer-plates $d'$ and $d^2$. Upon the lower strainer-plate $d'$ is placed a layer of coarse sand or gravel and upon the upper plate $d^2$ a layer of finer sand or gravel, through which layers and strainer-plates the water from the vessel $b$ is adapted to rise. The water upon leaving the filtering vessel $d$ passes out by two pipe-bends $e$, leading into vertically-disposed tubes $f$, arranged above and secured to an upper tube or thimble $f'$. A lower tube or thimble $f^2$ is supported in the brickwork of a furnace-flue $m'$. Between the thimbles $f'$ and $f^2$ is arranged a series of substantially horizontal heating and disk-like chambers $h$. These chambers $h$ are held to position between the thimbles by means of the bolt or rod $k$. The tubes $f$ discharge into a vertically-disposed pipe $g$, depending from the thimble $f'$ and extending downward to the lowermost of the chambers $h$. Each of the chambers $h$ is divided into an upper and lower compartment by a horizontally-arranged partition $h'$. The partition $h'$ of the lowermost chamber $h$ is connected to the lower end of the tube $g$, as shown at Fig. 4, and the other partition $h'$ extends inwardly and fits snugly against the tube $g$. The compartments of each chamber $h$ communicate through a space formed between the outer end of the chamber and the outer end of the partition. Each chamber $h$ has a central orifice with an opening $h^2$, leading into each compartment of the chamber. The orifices of the chambers are in alinement with each other and are of a diameter larger than the diameter of the tube $g$, which is arranged concentrically in said orifices.

In operation water from the pipe $a$ first flows through the purifying vessel $b$ and then through the pipe $c$ and filtering vessel $d$ until it overflows into the bends $e$ and pipes $f$. From the pipes $f$ it enters the tube $g$, from which it discharges into the lower compartment of the lowermost chamber $h$. From this compartment it flows upward into the upper compartment, thence out through the opening $h^2$ to the central orifice, and into the lower compartment of the next succeeding chamber $h$. The water thus takes a zigzag course upward through all the compartments of the chambers $h$, as indicated by the arrows in Fig. 4. From the uppermost chamber $h$ it passes by the pipe $l$ to a steam generator or boiler. (Not shown.) The chambers $h$ are located in the flue $m'$, leading from or in communication with a main flue $m$, which may be controlled by a gate or damper $n$, as shown in Fig. 1, of a suitable furnace, and the water passing through the chambers is highly heated prior to its introduction into the boiler.

In Figs. 1, 2, and 3 there is illustrated a way in which the interior of the chambers $h$ may be flushed or scoured. On the pipe $a$, leading to the vessel $b$, is placed a valve $a'$, so that communication with the vessel $b$ may be cut off. From the pipe $a$, above the valve $a'$, extends a pipe $o$, leading to the outlet-pipe $l$. The pipe $o$ has a valve $o'$, and the pipe $l$ has a valve $l'$. When the chambers are to be scoured, the valve $a'$ is closed, the valve $o'$ opened, and the valve $l'$ closed. The lower thimble $f^2$, which is in open communication with the tube $g$, has a discharge-pipe $p$ and valve $p'$, controlling the same, which pipe discharges through the outlet $q'$. The water from the pipe $a$ passes through the pipe $o$ into the pipe $l$ and thence to the orifices and openings $h^2$ of the chambers $h$. The water traverses the chambers in a zigzag course, but in a direction opposite to that of the water during the heating thereof. After scouring each chamber the water passes into the thimble $f^2$ and through the pipe $p$ to the outlet $q$. The exterior of the chamber $h$ may be reached for the purpose of cleansing through the door $r$ of the fireproof material in the flue $m'$. The pipe $c$, leading from the vessel $b$ to the filtering vessel $d$, is provided with a valve $c'$, by means of which the feeding of water to the filter and chambers may be cut off when desired.

Having thus described the nature and objects of my invention, what I claim as new, and desire to secure by Letters Patent, is—

1. In a feed-water-heating apparatus, a series of disk-like hollow chambers superposed upon each other, a series of partitions arranged horizontally in each chamber and dividing the same into two compartments, a series of central orifices each formed in a chamber and in alinement with each other, said orifices separated from each other by the partitions, the compartments of each chamber communicating at their outer ends, and a tube adapted to traverse the central orifices and to lead water to the lower compartment of the lowest in series of chambers, all arranged so that the water is caused to traverse the compartments in an upward zigzag direction, substantially as and for the purposes described.

2. In an apparatus of the character described, a purifying vessel, a filtering-chamber and a pipe leading from the purifying vessel to the bottom of the filtering-chamber, in combination with a heating apparatus arranged below the filtering-chamber and consisting of a series of superposed hollow disk-like chambers connected with each other, the lowermost of said chambers being connected with the filtering-chamber, all arranged so that the water from the filtering-chamber is caused to travel upward through the disk-like chambers, substantially as and for the purposes described.

3. In an apparatus of the character described, a feed-pipe, a filtering vessel, a purifying vessel and a series of superposed hollow disk-like heating-chambers, two thimbles between which the heating-chambers are held, a vertically-arranged tube communicating with the purifying vessel and the lowermost heating-chamber, said heating-chambers being connected so that the liquid from the vertical pipe is caused to travel upward through the heating-chambers, a pipe leading from the feed-pipe to the uppermost heating-chamber, and a valve controlling said pipe, whereby when said valve is opened water is forced downward through said heating-chambers to scour the same, substantially as and for the purposes described.

In witness whereof I have hereunto set my hand in presence of two witnesses.

JAN v. GRUBINSKI. [L. S.]

Witnesses:
WLADYSLAW ZANIOWSKI,
KOJETAN ATTODOWSKI.